(12) United States Patent
Hori

(10) Patent No.: US 11,054,018 B2
(45) Date of Patent: Jul. 6, 2021

(54) VEHICLE DRIVE-FORCE TRANSMITTING APPARATUS

(71) Applicant: TOYOTA JIDOSHA KABUSHIKI KAISHA, Toyota (JP)

(72) Inventor: Tetsuo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/734,458

(22) Filed: Jan. 6, 2020

(65) Prior Publication Data

US 2020/0240511 A1 Jul. 30, 2020

(30) Foreign Application Priority Data

Jan. 25, 2019 (JP) .............................. JP2019-011717

(51) Int. Cl.

| | |
|---|---|
| *F16H 57/04* | (2010.01) |
| *F16H 48/06* | (2006.01) |
| *F16H 57/021* | (2012.01) |
| *F16H 57/037* | (2012.01) |
| *B60K 6/365* | (2007.10) |

(Continued)

(52) U.S. Cl.
CPC ......... *F16H 57/0439* (2013.01); *F16H 48/06* (2013.01); *F16H 57/021* (2013.01); *F16H 57/037* (2013.01); *F16H 57/0423* (2013.01); *F16H 57/0424* (2013.01); *F16H 57/0452* (2013.01); *F16H 57/0482* (2013.01); *B60K 6/365* (2013.01); *B60K 6/445* (2013.01); *B60Y 2200/92* (2013.01); *F16H 57/0441* (2013.01); *F16H 2057/02034* (2013.01); *F16H 2057/02043* (2013.01)

(58) Field of Classification Search
None
See application file for complete search history.

(56) References Cited

U.S. PATENT DOCUMENTS

| | | | |
|---|---|---|---|
| 5,662,188 A * | 9/1997 | Ito | B62D 5/07 184/11.1 |
| 8,459,134 B2 * | 6/2013 | Harashima | F04C 14/04 74/325 |

(Continued)

FOREIGN PATENT DOCUMENTS

| | | |
|---|---|---|
| JP | 2009-222159 A | 10/2009 |
| JP | 2017-136964 A | 8/2017 |
| JP | 2018-25282 A | 2/2018 |

OTHER PUBLICATIONS

EP.20150772.A Search Opinion (Year: 2020).*

*Primary Examiner* — Dirk Wright
(74) *Attorney, Agent, or Firm* — Oblon, McClelland, Maier & Neustadt, L.L.P.

(57) ABSTRACT

A vehicle drive-force transmitting apparatus including: a differential ring gear that is to be rotated about a first axis; a pump that is to be driven when the differential ring gear is rotated; a casing that stores therein the differential ring gear and the pump; a pipe that is connected to the pump so as to supply oil sucked by the pump, to lubrication-required elements of the drive-force transmitting apparatus; a catch tank that is provided by a rib provided in the casing; and a guide way that is provided by a rib provided in the casing. The guide way is configured to guide the oil discharged from the pipe, to the catch tank.

5 Claims, 3 Drawing Sheets

(51) Int. Cl.
   *B60K 6/445*   (2007.10)
   *F16H 57/02*   (2012.01)

(56) References Cited

U.S. PATENT DOCUMENTS

| | | | |
|---|---|---|---|
| 8,727,928 B2* | 5/2014 | Harashima | F16H 57/0483 |
| | | | 475/221 |
| 8,899,381 B2 | 12/2014 | Ebihara et al. | |
| 10,253,868 B2* | 4/2019 | Kiyokami | F16H 57/0453 |
| 10,309,524 B2* | 6/2019 | Kiyokami | F16H 57/045 |
| 10,400,834 B2* | 9/2019 | Sugiura | F01M 1/02 |
| 10,465,574 B2* | 11/2019 | Kiyokami | F01M 5/005 |
| 10,738,878 B2* | 8/2020 | Kiyokami | F16H 57/0482 |
| 10,808,831 B2* | 10/2020 | Ikeda | F16H 57/0404 |
| 2011/0297258 A1* | 12/2011 | Tanaka | F16H 61/0025 |
| | | | 137/565.11 |
| 2013/0283972 A1 | 10/2013 | Yamamoto et al. | |
| 2018/0045295 A1 | 2/2018 | Kiyokami et al. | |
| 2018/0334025 A1* | 11/2018 | Hashimoto | B60K 6/365 |
| 2020/0132184 A1* | 4/2020 | Umeki | F16H 57/045 |

* cited by examiner

VEHICLE DRIVE-FORCE TRANSMITTING APPARATUS

This application claims priority from Japanese Patent Application No. 2019-011717 filed on Jan. 25, 2019, the disclosure of which is herein incorporated by reference in its entirety.

FIELD OF THE INVENTION

The present invention relates to a drive-force transmitting apparatus that is to be installed in a vehicle, more particularly, to lubrication of a bearing supporting a rotary member that constitute a part of the drive-force transmitting apparatus.

BACKGROUND OF THE INVENTION

There is proposed a drive-force transmitting apparatus that is to be installed in a vehicle, wherein the drive-force transmitting apparatus includes: a differential ring gear that is to be rotated about a first axis; a rotary member that is to be rotated about a second axis which is parallel to the first axis and which is distant from the first axis in a given direction; a mechanical pump that is to be driven by rotation of the differential ring gear; and a casing that stores therein the differential ring gear, the rotary member and the mechanical pump, such that oil sucked by the mechanical pump is supplied to lubrication-required elements such as gears and bearings. The above-described given direction is a direction including a component of a horizontal direction of the vehicle in a state in which the drive-force transmitting apparatus is installed in the vehicle. Such a drive-force transmitting apparatus is disclosed in each of JP-2017-136964A and JP-2018-25282A. In the drive-force transmitting apparatus disclosed in JP-2017-136964A, an oil storage is provided to store therein the oil pumped up by the mechanical pump.

SUMMARY OF THE INVENTION

By the way, in general, a pipe is used to constitute a supply passage that is connected to a pump so as to delivery oil sucked by the pump. However, for lubricating a bearing through which the rotary member is held by the casing, if the pipe is extended to reach the bearing, the pipe is required to have a complicated shape whereby manufacturability of the pipe is reduced and accordingly the manufacturing cost is problematically increased.

The present invention was made in view of the background art described above. It is therefore an object of the present invention to provide a drive-force transmitting apparatus that is to be installed in a vehicle, wherein the drive-force transmitting apparatus includes a mechanical pump that is to be driven by rotation of a differential ring gear, and wherein the drive-force transmitting apparatus is capable of lubricating a bearing that supports a rotary member without extending a pipe of an oil supply passage.

The above object is achieved according to the following aspects of the present invention.

According to a first aspect of the invention, there is provided a drive-force transmitting apparatus that is to be installed in a vehicle, the drive-force transmitting apparatus comprising: a differential ring gear that is to be rotated about a first axis; a rotary member that is to be rotated about a second axis, the second axis being parallel with the first axis and being distant from the first axis in a given direction, the given direction being a direction including a component of a horizontal direction of the vehicle in an apparatus installed state in which the drive-force transmitting apparatus is installed in the vehicle; a mechanical pump that is to be driven when the differential ring gear is rotated; a casing that stores therein the differential ring gear, the rotary member and the pump; a bearing through which the rotary member is held by the casing; a pipe that is connected at a proximal end portion thereof to the pump so as to supply oil sucked by the pump, to lubrication-required elements of the drive-force transmitting apparatus; the pipe extending in an extending direction and having a discharge hole provided in a distal end portion thereof, the extending direction being generally an upward direction of the vehicle in the apparatus installed state; a catch tank that is provided by a first rib provided in the casing, the catch tank being configured to store therein the oil that is to be supplied to the bearing; and a guide way that is provided by a second rib provided in the casing, the guide way being configured to guide the oil discharged from the discharge hole, to the catch tank. For example, the casing includes a partition wall by which an interior of the casing is sectioned into a first room and a second room, wherein the differential ring gear, the pump, the pipe, the catch tank and the guide way are disposed in the first room, while the rotary member and the bearing are disposed in the second room, wherein the first and second ribs are provided on the partition wall, and wherein the catch tank is in communication with a through-hole that is formed through the partition wall, such that the oil is to be supplied, from the catch tank that is disposed in the first room, through the through-hole, to the bearing that is disposed in the second room.

According to a second aspect of the invention, in the drive-force transmitting apparatus according to the first aspect of the invention, there is further provided a second-axis gear which is stored in the casing and which is to rotated, together with the differential ring gear, about the second axis, wherein the guide way and the catch tank are spaced apart from each other, and cooperate with each other to define, between the guide way and the catch tank, a gap through which the oil stirred by the second-axis gear is to be introduced into the catch tank.

According to a third aspect of the invention, in the drive-force transmitting apparatus according to the second aspect of the invention, sad catch tank is configured such that a surplus part of the oil is discharged from one of opposite sides of the catch tank in the horizontal direction that is perpendicular to the second axis, the one of the opposite sides of the catch tank being remote from the gap.

According to a fourth aspect of the invention, in the drive-force transmitting apparatus according to any one of the first through third aspects of the invention, the rotary member is a rotor shaft of an electric motor.

In the drive-force transmitting apparatus according to the first aspect of the invention, when the oil sucked by the pump is discharged from the discharge hole of the pipe, the discharged oil is caused to pass through the guide way so as to be introduced into the catch tank. This arrangement makes it possible to supply the oil to the bearing, without extending the pipe to the bearing, thereby restraining reduction of the manufacturability of the pipe. Further, each of the catch tank and the guide way is provided by a part of the casing in the form of a corresponding one of the first and second ribs, so that the catch tank and the guide way can be easily forming by casting. Thus, the bearing can be lubricated with cost increase being restrained.

In the drive-force transmitting apparatus according to the second aspect of the invention, even when it becomes impossible to supply the oil to the bearing by the pump, for example, in the event of failure of the pump, the bearing can be lubricated by the oil stirred by the second-axis gear.

In the drive-force transmitting apparatus according to the third aspect of the invention, when a part of the oil stored in the catch tank becomes surplus, the surplus part of the oil is discharged from the one of opposite sides of the catch tank which is remote from the gap, so that it is possible to restrain so-called "stirring loss" which could be cause if the surplus part of the oil were stirred by the second-axis gear.

In the drive-force transmitting apparatus according to the fourth aspect of the invention, it is possible to assure a sufficient amount of the oil that is supplied to the bearing supporting the rotor shaft of the electric motor, thereby preventing the bearing from suffering from galling that could be caused by shortage of the oil supplied to the bearing.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

EMBODIMENT

Figure 1:
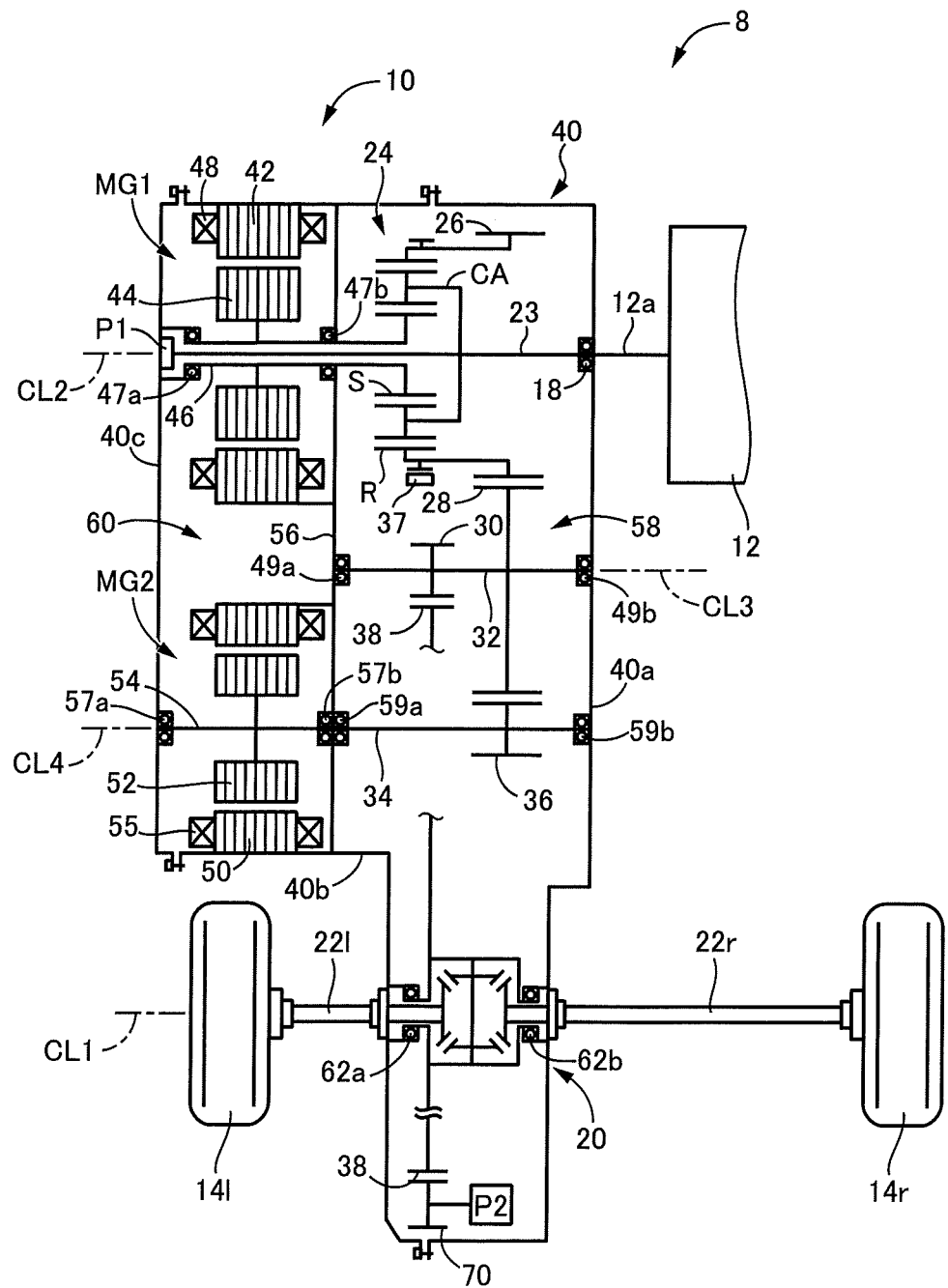
FIG. 1 is a view schematically showing, by way of example, construction of a vehicle drive-force transmitting apparatus to which the present invention is applied.

FIG. 1 is a view schematically showing, by way of example, construction of a drive-force transmitting apparatus 10 to which the present invention is applied, wherein the drive-force transmitting apparatus 10 is to be installed in a vehicle 8. The drive-force transmitting apparatus 10 is to be used advantageously in the vehicle 8 of FF (front engine/front drive) system. The drive-force transmitting apparatus 10 is a drive-force transmitting apparatus of hybrid type, which is to be disposed between an engine 12 and drive wheels 14 of the vehicle 8, so as to transmit a drive force outputted from the engine 12 as a main drive-force source and a drive force outputted from a second electric motor MG2 as another drive-force source, to the right and left drive wheels 14r, 14l via a differential device 20 and right and left axles 22r, 22l.

As shown in FIG. 1, the drive-force transmitting apparatus 10 includes the above-described differential device 20, the above-described axles 22, an input shaft 23, a planetary gear device 24, an output gear 26, a counter gear 28, a differential drive gear 30, a counter shaft 32, a drive-force transmitting shaft 34, a reduction gear 36, a first electric motor MG1 and the above-described second electric motor MG2. The differential device 20 and the axles 22 are disposed to be rotatable about a first axis CL1. The input shaft 23 is disposed to be rotatable about a second axis CL2. The planetary gear device 24, first electric motor MG1 and output gear 26 are disposed to be coaxial with the input shaft 23 and are located radially outside the input shaft 23. The counter shaft 32 is disposed to be rotatable about a third axis CL3. The counter gear 28 and differential drive gear 30 are disposed on the counter shaft 32. The drive-force transmitting shaft 34 is disposed to be rotatable about a fourth axis CL4. The second electric motor MG2 is disposed to be coaxial with the drive-force transmitting shaft 34. The reduction gear 36 is disposed on the drive-force transmitting shaft 34. All of these rotary members are disposed inside a casing 40. The drive-force transmitting apparatus 10 further includes a parking lock mechanism 37 configured to stop rotation of the output gear 26. It is noted that the casing 40 corresponds to "casing" recited in the appended claims. It is also noted that all of the first through fourth axes CL1-CL4 are rotary axes that are parallel to a width direction of the vehicle 8.

The input shaft 23 is connected to the engine 12 through members such as a crank shaft 12a and a damper (not shown), in a drive-force transmittable manner. The input shaft 23 is held, through members such as a bearing 18, by the casing 40 as a non-rotary member, such that the input shaft 23 is rotatable about the second axis CL2.

The planetary gear device 24, which is disposed to be coaxial with the second axis CL2, is a single-pinion type planetary gear device (differential mechanism) that includes a sun gear S, a carrier CA and a ring gear R. The planetary gear device 24 serves as a drive-force distributing mechanism configured to distribute a drive force of the engine 12 to the output gear 26 and the first electric motor MG1. The sun gear S of the planetary gear device 24 is connected to the first electric motor MG1 in a drive-force transmittable manner. The carrier CA of the planetary gear device 24 is connected to the engine 12 through the input shaft 23 and the crank shaft 12a in a drive-force transmittable manner. The ring gear R of the planetary gear device 24 is connected to the output gear 26 in a drive-force transmittable manner. It is noted that the ring gear R and the output gear 26 are formed integrally with each other, namely, are constituted by a compound gear.

A first oil pump P1 is disposed on the second axis CL2, and is located in one of opposite end portions, which is remote from the engine 12, in an axial direction of the input shaft 23. The first oil pump P1 is to be driven by the engine 12. The first oil pump P1 includes a drive gear (not shown) that is connected to an axial end portion of the input shaft 23, such that the first oil pump P1 is to be driven by the engine 12 through the input shaft 23.

The first electric motor MG1 is disposed in a position adjacent to the planetary gear device 24, with a partition wall 56 (that is a part of the casing 40) being located between the first electric motor MG1 and the planetary gear device 24 in a direction of the second axis CL2. The first electric motor MG1 includes an annular-shaped stator 42 that is unrotatably fixed to the casing 40 as the non-rotary member, an annular-shaped rotor 44 disposed on an inner peripheral side of the stator 42, and a rotor shaft 46 fixed in an inner circumferential surface of the rotor 44. The stator 42 is provided with a stator coil 48 that is wound on the stator 42. The rotor shaft 46 is held at its axially opposite end portions by the casing 40 through a pair of bearings 47a, 47b, such that the rotor shaft 46 is rotatable about the second axis CL2.

The output gear 26 is connected to the ring gear R of the planetary gear device 24, and meshes with the counter gear 28 that is disposed on the counter shaft 32. The counter shaft 32 is held at its axially opposite end portions by the casing 40 through a pair of bearings 49a, 49b, such that the counter shaft 32 is rotatable about the third axis CL3.

The second electric motor MG2 and the reduction gear 36 are disposed to be rotatable about the fourth axis CL4, with the partition wall 56 being located between the second electric motor MG2 and the reduction gear 36 in a direction of the fourth axis CL4.

The second electric motor MG2 includes an annular-shaped stator 50 that is unrotatably fixed to the casing 40 as the non-rotary member, an annular-shaped rotor 52 disposed on an inner peripheral side of the stator 50, and a rotor shaft 54 fixed in an inner circumferential surface of the rotor 52. The stator 50 is provided with a stator coil 55 that is wound on the stator 50. The rotor shaft 54 is held at its axially opposite end portions by the casing 40 through a pair of bearings 57a, 57b, such that the rotor shaft 54 is rotatable about the fourth axis CL4.

The reduction gear 36 is formed integrally with the drive-force transmitting shaft 34, and meshes with the counter gear 28 disposed on the counter shaft 32. The number of teeth of the reduction gear 36 is smaller than the number of teeth of the counter gear 28. Thus, rotation of the second electric motor MG2 is transmitted to the counter shaft 32 through the reduction gear 36 and the counter gear 28, such that a rotational speed of the counter shaft 32 is made lower than a rotational speed of the second electric motor MG2. The drive-force transmitting shaft 34 is held at its axially opposite end portions by the casing 40 through a pair of bearings 59a, 59b, such that the drive-force transmitting shaft 34 is rotatable about the fourth axis CL4.

The counter gear 28 and the differential drive gear 30 are disposed on the counter shaft 32, unrotatably relative to the counter shaft 32 that is to be rotated about the third axis CL3. The counter gear 28 meshes with the output gear 26 and the reduction gear 36 so that the drive force outputted from the engine 12 and/or the drive force outputted from the second electric motor MG2 are to be transmitted. The differential drive gear 30 meshes with a differential ring gear 38 of the differential device 20. Thus, when the drive force drive force outputted from the engine 12 and/or the drive force outputted from the second electric motor MG2 are transmitted to the counter shaft 32 through the output gear 26 and/or the reduction gear 36, the drive force or forces are transmitted to the differential device 20 through the differential drive gear 30.

The differential device 20 and the pair of axles 22r, 22l are disposed to be rotatable about the first axis CL1. The differential ring gear 38 of the differential device 20 meshes with the differential drive gear 30 so that the drive force outputted from the engine 12 and/or the drive force outputted from the second electric motor MG2 are to be inputted to the differential device 20 through the differential ring gear 38.

The differential device 20 is constituted by a well-known differential mechanism, and is configured to transmit the drive force to the right and left axles 22r, 22l while allowing rotation of each of the axles 22r, 22l relative to the other of the axles 22r, 22l. It is noted that detailed description of the differential device 20, which is a known device, is not provided. The differential device 20 is held, at its opposite end portions that are opposite to each other in a direction of the first axis CL1, by the casing 40 through a pair of bearings 62a, 62b, such that the differential device 20 is rotatable about the first axis CL1.

In the drive-force transmitting apparatus 10 constructed as described above, the drive force of the engine 12 is transmitted to the right and left drive wheels 14r, 14l through the planetary gear device 24, output gear 26, counter gear 28, counter shaft 32, differential drive gear 30, differential device 20 and axles 22r, 22l. Further, the drive force of the second electric motor MG2 is transmitted to the right and left drive wheels 14r, 14l through the rotor shaft 54, drive-force transmitting shaft 34, reduction gear 36, counter gear 28, counter shaft 32, differential drive gear 30, differential device 20 and axles 22r, 22l.

The casing 40 is constituted by a housing 40a, an axle case 40b and a case cover 40c that are fixed to one another. The axle case 40b opens in its opposite ends that are opposite to each other in the direction of the second axis CL2. The axle case 40b is fixedly connected at one of the openings to the housing 40a by bolts, and is fixedly connected at the other of the openings to the case cover 40c by bolts.

The axle case 40b is provided with the partition wall 56 that extends in a direction perpendicular to the second axis CL2. By the partition wall 56, an interior of the casing 40 is sectioned into a gear room 58 and a motor room 60, such that various gears or devices such as the planetary gear device 24, output gear 26, counter gear 28, reduction gear 36 and differential device 20 are disposed within the gear room 58 and such that the first and second electric motors MG1, MG2 are disposed within the motor room 60. It is noted that the first oil pump P1 is disposed within the motor room 60. It is also noted that the gear room 58 and the motor room 60 correspond to "first room" and "second room" recited in the appended claims, respectively.

Figure 2:
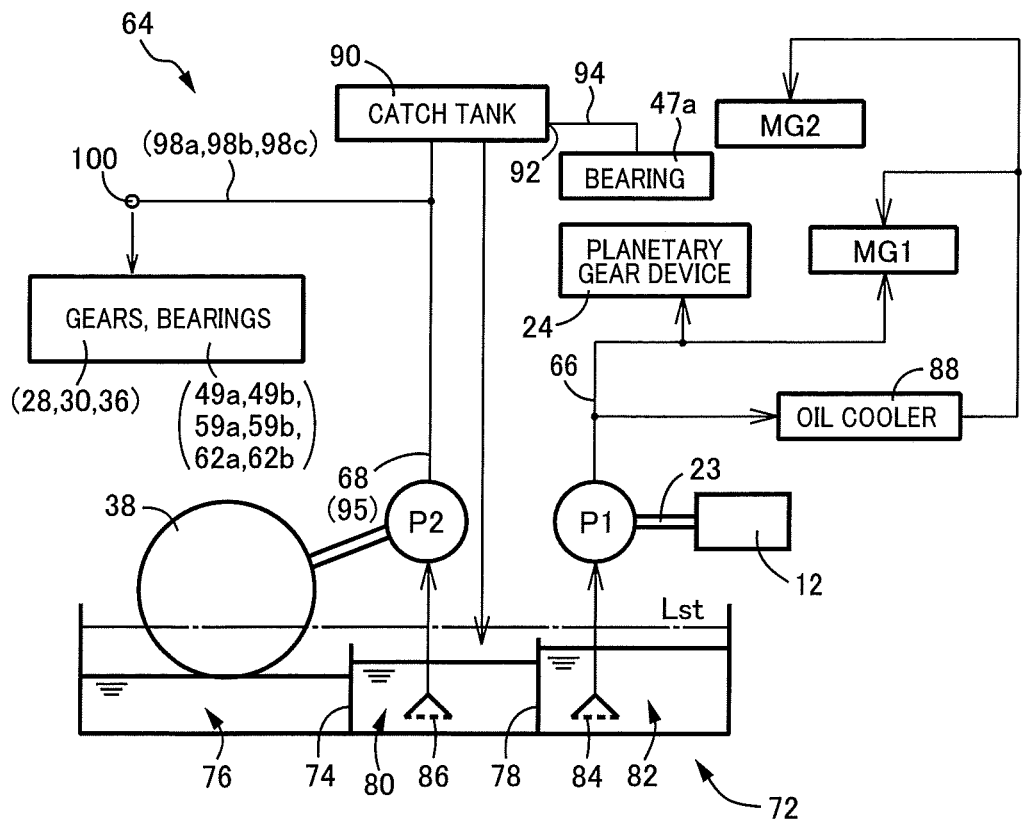
FIG. 2 is a circuit diagram schematically showing, by way of example, construction of a lubrication device that is provided in the drive-force transmitting apparatus of FIG. 1.

The drive-force transmitting apparatus 10 further includes a lubrication device 64 shown in FIG. 2. The lubrication device 64 is provided with suction devices in the form of the first and second oil pumps P1, P2, which are connected to respective first and second supply passages 66, 68 that are independent from each other. Thus, each of the first and second oil pumps P1, P2 is configured to supply oil (lubricant) to assigned ones of lubrication-required parts or elements of the drive-force transmitting apparatus 10.

As shown in FIG. 1, the first oil pump P1 is a mechanical pump, which is connected to the input shaft 23 so as to be mechanically rotated or driven by the engine 12. The second oil pump P2 is a mechanical pump, which is to be mechanically rotated or driven through a pump drive gear 70 that meshes with the differential ring gear 38. It is noted that the second oil pump P2 corresponds to "mechanical pump" recited in the appended claims.

As shown in FIG. 2, the first and second oil pumps P1, P2 are configured to suck the oil from an oil storage portion 72 that is provided in a bottom portion of the casing 40, and to discharge the oil to the first and second supply passages 66, 68. The oil storage portion 72 is constituted by the casing 40 as such, and includes a first storage portion 76, a second storage portion 80 and a third storage portion 82, which are arranged in a longitudinal direction of the vehicle 8 (hereinafter referred to as "vehicle longitudinal direction" or "longitudinal direction"). The first storage portion 76 is located on a rear side of the other storage portion (i.e., the second and third storage portions 80, 82) in the vehicle longitudinal direction, and is sectioned from the other storage portion by a first partition wall 74. The first storage portion 76 is located on a lower side of the differential device 20 in a vertical direction of the vehicle 8 (hereinafter referred to as "vehicle vertical direction" or "vertical direction"). The above-described other storage portion, which is other than the first storage portion 76, is sectioned by a second partition wall 78 into two storage portions, i.e., the second and third storage portions 80, 82. The second storage portion 80 is adjacent to the first storage portion 76, and is located between the first and third storage portions 76, 82 in the vehicle longitudinal direction. The third storage portion 82 is adjacent to the second storage portion 80, and is located on a front side of the second storage portion 80 in the vehicle longitudinal direction. A first inlet port 84 of the first oil pump P1 is located within the third storage portion 82, while a second inlet port 86 of the second oil pump P2 is located within the second storage portion 80. The inlet ports 84, 86 are connected to the respective first and second oil pumps P1, P2 through respective inlet passages that are provided independently of each other.

The first and second partition walls 74, 78 cooperate to serve as an oil-level-balance limiting portion configured to limit a balance of oil level while allowing or limiting passage of the oil among the first, second and third storage portions 76, 78, 82. For example, in FIG. 2, one-dot chain line indicates a stationary oil level Lst that is an oil level in a static state in which change of the oil level is stopped with operations of both of the oil pumps P1, P2 being stopped during stop of the vehicle 8. As shown in FIG. 2, in the static state, the oil supplied to various elements or parts of the drive-force transmitting apparatus 10 is returned down to the oil storage portion 72 whereby the oil level becomes higher than upper ends of the first and second partition walls 74, 78 so that the passage of the oil among the first, second and third storage portions 76, 78, 82 is allowed and accordingly the oil level is made even among the first, second and third storage portions 76, 78, 82. However, when the vehicle 8 is running or when the oil pumps P1, P2 are operated, the oil is supplied to various elements or parts of the drive-force transmitting apparatus 10 and accordingly an amount stored in the oil storage portion 72 is reduced whereby the oil level becomes lower than the upper ends of the first and second partition walls 74, 78 so that the passage of the oil among the first, second and third storage portions 76, 78, 82 is limited by first and second partition walls 74, 78 and accordingly the oil level is made uneven among the first, second and third storage portions 76, 78, 82, as indicated by solid lines in FIG. 2. That is, the oil level in each of the first, second and third storage portions 76, 78, 82 is changeable individually from the others of the storage portions 76, 78, 82.

A position of the upper end of the first partition wall 74 and a position of the upper end of the second partition wall 78 are higher than a position of a lower end of the differential device 20 in the vertical direction, so that a part of the differential device 20 is immersed in the oil in the static state in which the oil level is higher than the upper ends of the first and second partition walls 74, 78. With the differential device 20 being partially immersed in the oil, the oil is scooped up by gears such as the differential ring gear 38 upon start of running of the vehicle 8, whereby the oil is sprayed onto various elements or parts of the drive-force transmitting apparatus 10. Thus, a satisfactory lubrication state can be established even when the vehicle 8 starts to run, namely, when a sufficient amount of the oil is difficult to be supplied by the second oil pump P2.

When the oil pumps P1, P2 are operated, for example, during running of the vehicle 8, the oil is sucked by the oil pumps P1, P2 and is scooped up by gears such as the differential ring gear 38 that are rotated depending on a running speed V of the vehicle 8 whereby the oil level is reduced to be lower than the upper ends of the second partition walls 74, 78. The oil level in the first storage portion 76 is dependent on a balance (equilibrium) between an amount of the oil scooped up by the gears such as the differential ring gear 38 and an amount of the oil returned to the first storage portion 76. The oil level in the second storage portion 80 is dependent on a balance between an amount of the oil sucked by the second oil pump P2 and an amount of the oil returned to the second storage portion 80. The oil level in the third storage portion 82 is dependent on a balance between an amount of the oil sucked by the first oil pump P1 and an amount of the oil returned to the third storage portion 82. In the present embodiment, a volume of the first storage portion 76, i.e., a position and a shape of the first partition wall 74, for example, are determined such that the oil level in the first storage portion 76 is reduced with higher priority whereby stirring of the oil by rotation of the differential device 20 is restrained and accordingly so-called "stirring loss" is reduced. Further, the oil level in the second storage portion 80 in which the second inlet port 86 is disposed and the oil level in the third storage portion 82 in which the first inlet port 84 is disposed are made higher than the oil level in the first storage portion 76, for thereby restraining air suction by the oil pumps P1, P2 which could be caused if the inlet ports 86, 84 are exposed above the oil level, so that the oil is suitably sucked by the oil pumps P1, P2 whereby stable supply of the oil to the lubrication-required elements can be made.

Further, since the second and third storage portions 80, 82 are sectioned, by provision of the second partition wall 78, from each other in the vehicle longitudinal direction, a width of each of the second and third storage portions 80, 82 measured in the vehicle longitudinal direction is made small whereby uneven distribution of the oil due to change of running speed of the vehicle 8 and change of posture of the vehicle 8 which is caused by, for example, road slope, is restrained and accordingly change of the oil level is reduced. Thus, it is possible to further appropriately restrain air suction by the oil pumps P2, P1 connected to the respective inlet ports 86, 84 that are disposed in the respective oil storage portions 80, 82.

The first supply passage 66 connected to an outlet port of the first oil pump P1 is configured to supply the oil to the lubrication-required elements such as the planetary gear device 24, first electric motor MG1, second electric motor MG2 and bearings (47a, 47b, 57a, 57b) rotatably supporting the rotor shafts 46, 54 of the respective first and second electric motors MG1, MG2. The first supply passage 66 is provided with an oil cooler 88 that is configured to cool the oil, so as to the supply the cooled oil to the first and second electric motors MG1, MG2, for thereby cooling the first and second electric motors MG1, MG2 and preventing the motors MG1, MG2 from being excessively heated. The oil cooler 88 is configured to cool the oil, for example, through a heat exchanger using air cooling or water cooling. Since the first oil pump P1 is driven by the engine 12 that can be driven even during stop of running of the vehicle 8, it is possible to cause the first oil pump P1 to suck the oil at a rate that is not dependent on the running speed V, so that the oil can be supplied to the lubrication-required elements, irrespective of whether the vehicle 8 is running or not.

The second oil pump P2 is to be rotated or driven with rotation of the differential ring gear 38 of the differential device 20. The second supply passage 68 connected to an outlet port of the second oil pump P2 is configured to supply the oil to the lubrication-required elements of the drive-force transmitting apparatus 10. The lubrication-required elements, which are to be lubricated by the oil discharged from the second oil pump P2, are mainly gears such as the gears 28, 30, 36 that are disposed in the gear room 58 and bearings such as the bearings 49a, 49b, 59a, 59b, 62a, 62b that rotatably support rotary shafts of the gears. The second oil pump P2, which is driven with rotation of the differential ring gear 38 of the differential device 20, is driven even during EV running mode in which rotation of the engine 12 is stopped, so as to be capable of sucking the oil at a rate that is substantially proportional with the vehicle running speed V and supplying the oil to the lubrication-required elements. That is, the running speed V corresponds to a pump rotational speed of the second oil pump P2 and corresponds to a rate of the oil discharged from the second oil pump P2. Although the differential device 20 is lubricated by the oil scooped up by the differential ring gear 38, the differential device 20 can be lubricated by also the oil supplied from the second supply passage 68.

In the lubrication device 64, a catch tank 90 is provided in a given position, which is located on an upper side of the bearing 47a supporting the rotor shaft 46 of the first electric motor MG1 in the vertical direction in a state (hereinafter referred to as "apparatus installed state") in which the drive-force transmitting apparatus 10 is installed in the vehicle 8. The catch tank 90 is in communication with an introduction hole 92, for supplying the oil to the bearing 47a that supports the rotor shaft 46 of the first electric motor MG1. Thus, when a level of the oil stored in the catch tank 90 reaches a height of the introduction hole 92, the oil is supplied to the bearing 47a through the introduction hole 92 and a third supply passage 94. Thus, the catch tank 90 is provided to store the oil that is to be supplied to the bearing 47a through which the rotor shaft 46 of the first electric motor MG1 is held by the casing 40. To the catch tank 90, a part of the oil discharged from the second oil pump P2 and a part of the oil scooped up by the differential ring gear 38 are supplied. It is noted that the bearing 47a is lubricated by the oil supplied through the first supply passage 66, namely, by the oil discharged from the first oil pump P1. However, since the bearing 47a is located in a position which the oil discharged from the first oil pump P1 cannot easily reach, there is provided another supply passage in the form of the third supply passage 94 through which the bearing 47a is to be lubricated, for thereby assuring lubrication of the bearing 47a. It is noted that first electric motor MG1 corresponds to "electric motor" recited in the appended claims and that the rotor shaft 46 of the first electric motor MG1 corresponds to "rotary member" recited in the appended claims. It is also noted that the introduction hole 92 corresponds to "through-hole" recited in the appended claims.

By the way, in an arrangement in which the oil is scooped up by the differential ring gear 38 of the differential device 20 and only a part of the scooped oil is stirred by the output gear 26 that is rotated about the second axis CL2 so as to be supplied to the catch tank 90, the amount of the oil stored in the catch tank 90 is easily made small because the oil level in the first storage portion 76 is likely to be made low and accordingly the amount of the oil scooped up by the differential ring gear 38 is likely to be made small during running of the vehicle 8, whereby the amount of the oil supplied to the bearing 47a through the introduction hole 92 and the third supply passage 94 is reduced, thereby causing a risk that lubrication of the bearing 47a could be insufficient. It might be possible to employ an arrangement in which the second supply passage 68 (through which the oil discharged from the second oil pump P2 is to be supplied) is made extend to the position of the bearing 47a that is located in the motor room 60. However, in this arrangement, the second supply passage 68 is required to have a complicated shape whereby the manufacturability is reduced and accordingly the manufacturing cost is increased. For avoiding the reduction of the manufacturability and the increase of the manufacturing cost, in the present embodiment, there is employed the arrangement in which a part of the oil discharged from the second oil pump P2 to the second supply passage 68 is stored in the catch tank 90, whereby an amount of the oil supplied to the introduction hole 92 is sufficiently obtained so as to assure lubrication of the bearing 47a. It is noted that the output gear 26 corresponds to "second-axis gear" that is recited in the appended claims.

Figure 3:
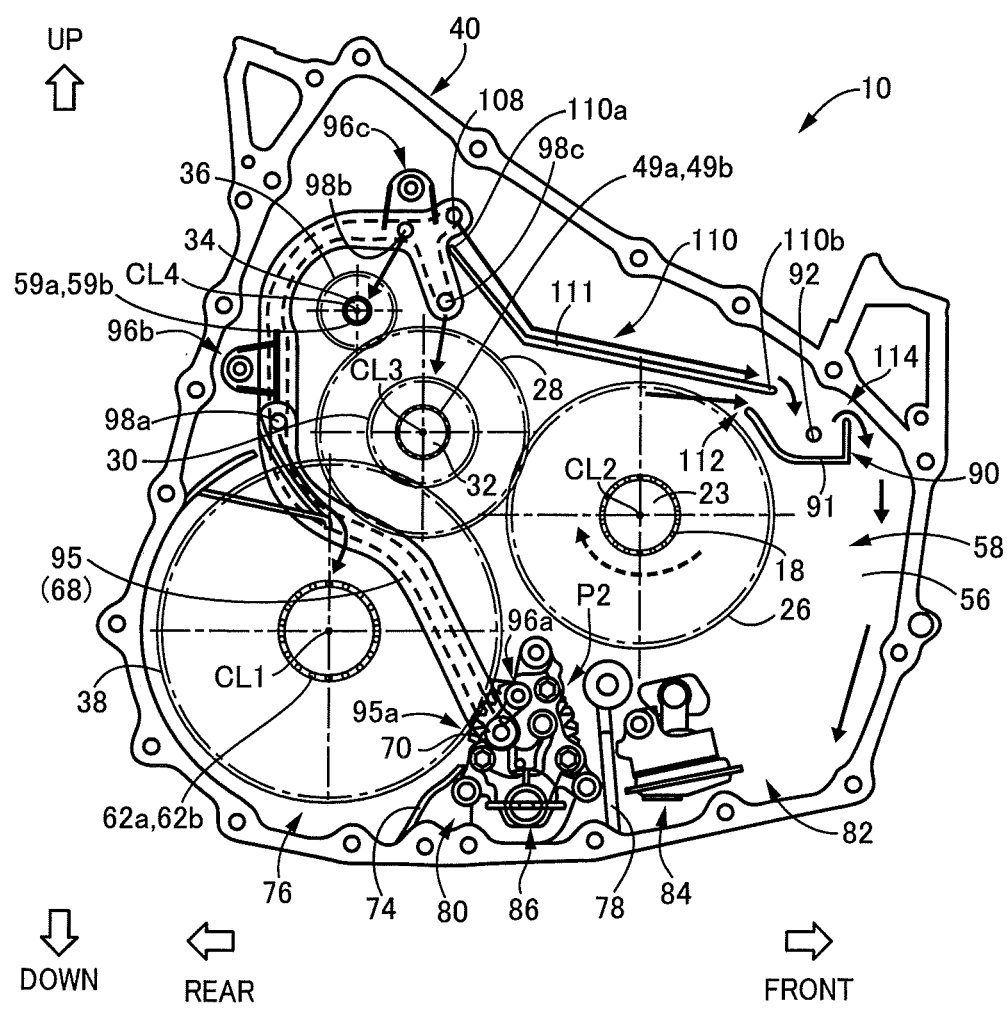
FIG. 3 is view for explaining construction of the lubrication device provided in a gear room of a casing shown in FIG. 1.

FIG. 3 is a view for explaining construction of the lubrication device 64 that is disposed within the gear room 58 of the casing 40. The view of FIG. 3 shows inside of the gear room 58 in the apparatus installed state, as seen from side of the engine 12 in the direction of the second axis CL2. It is noted that the apparatus installed state is a state in which the drive-force transmitting apparatus 10 is installed in the vehicle 8 and the vehicle 8 is on a horizontal road surface.

In FIG. 3, solid-line circle and one-dot chain line circle, whose centers lie at the first axis CL1, represent an addendum circle and a pitch circle of the differential ring gear 38, respectively, which is to be rotated about the first axis CL1. Further, solid-line circle and one-dot chain line circle, whose centers lie at the second axis CL2, represent an addendum circle and a pitch circle of the output gear 26, respectively, which is to be rotated about the second axis CL2. Still further, solid-line circle and one-dot chain line circle of a larger diameter, whose centers lie at the third axis CL3, represent an addendum circle and a pitch circle of the counter gear 28, respectively, which is to be rotated about the third axis CL3, and solid-line circle and one-dot chain line circle of a smaller diameter, whose centers lie at the third axis CL3, represent an addendum circle and a pitch circle of the differential drive gear 30, respectively, which is to be rotated about the third axis CL3. Moreover, solid-line circle and one-dot chain line circle, whose centers lie at the fourth axis CL4, represent an addendum circle and a pitch circle of the reduction gear 36, respectively, which is to be rotated about the fourth axis CL4. The first through fourth axes CL1-CL4 are parallel to one another, and each one of the first through fourth axes CL1-CL4 is distant from any one of the others of the first through fourth axes CL1-CL4 in a given direction, wherein the given direction is a direction including a component of the vertical direction and a component of the horizontal direction in the apparatus installed state.

As shown in FIG. 3, the first and second inlet ports 84, 86 of the respective first and second oil pumps P1, P2 are provided in a lower portion of the casing 40 in the vertical direction in the apparatus installed state. Further, in the lower portion of the casing 40, the first and second partition walls 74, 78 are provided to extend generally upwardly, and the second storage portion 80 is defined at its front and rear end by the second partition wall 78 and the first partition wall 74, respectively, in the vehicle longitudinal direction. The second inlet port 86 of the second oil pump P2 is located in the second storage portion 80.

The second storage portion 80 and the first storage portion 76 are located on respective front and rear sides of the first partition wall 74 in the vehicle longitudinal direction. With the differential ring gear 38 being partially immersed in the oil stored in the first storage portion 76, the oil stored in the first storage portion 76 is scooped up by the differential ring gear 38 when the differential ring gear 38 is rotated during running of the vehicle 8.

The third storage portion 82 and the second storage portion 80 are located on respective front and rear sides of the second partition wall 78 in the vehicle longitudinal direction. The first inlet port 84 of the first oil pump P1 is located in the third storage portion 82. The oil sucked through the first inlet port 84 is supplied to the first oil pump P1 through a suction passage (not shown) that connects between the first inlet port 84 and the first oil pump P1.

The second oil pump P2 is located right above the second inlet port 86. The second oil pump P2 is driven by the pump drive gear 70 that meshes with the differential ring gear 38. With the second oil pump P2 being driven, the oil stored in the second storage portion 80 is sucked through the second inlet port 86, and the sucked oil is discharged to the second supply passage 68 that is connected to the outlet port of the second oil pump P2.

The second supply passage 68 is constituted by a hollow oil pipe 95 in which an oil passage is defined as indicated by broken lines, as shown in FIG. 3. The oil pipe 95 is fixed to the casing 40 through a plurality of attaching members 96a-96c. The oil pipe 95 is connected at its proximal end portion 95a as one of opposite end portions to the second oil pump P2, and is fixed at the other of the opposite end portions to the casing 40. The oil pipe 95 extends from the second oil pump P2 generally upwardly in the apparatus installed state, while being fixed to the casing 40. The oil pipe 95 is constituted by, for example, a synthetic resin pipe. A metal reinforcement member may be additionally provided in the synthetic resin pipe, for example, by insert molding. It is noted that the oil pipe 95 corresponds to "pipe" recited in the appended claims.

The oil pipe 95 is provided with a plurality of hollow nozzles 98a-98c through which the oil is to be supplied to the lubrication-required elements such as the gears and bearings disposed within the gear room 58. Each of the nozzles 98a-98c extends in parallel to the second axis CL2, to a position that overlaps with a corresponding one or ones of the lubrication-required elements in a direction perpendicular to the second axis CL2. Further, each of the nozzles 98a-98c has an emission hole 100 (see FIG. 2) from which the oil flowing inside the nozzle is to be emitted toward a corresponding one or ones of the lubrication-required elements. Thus, a part of the oil, which is sucked by the second oil pump P2 and discharged to the oil pipe 95, passes through the nozzles 98a-98c and is emitted from the emission holes 100 of the nozzles 98a-98c, so as to be supplied to the lubrication-required elements.

For example, the oil emitted from the emission hole 100 of the nozzle 98a, which is provided in a longitudinally intermediate portion of the oil pipe 95, is moved along a rib or the like provided in the casing 40, as indicated by solid line in FIG. 3, so as to be supplied to, for example, the bearings 62a, 62b that rotatably support the differential device 20. Further, the oil emitted from the emission hole 100 of the nozzle 98b, which is provided in a distal end portion of the oil pipe 95, is supplied to the bearings 59a, 59b that rotatably support the reduction gear 36 and the drive-force transmitting shaft 34, as indicated by solid line in FIG. 3. Still further, the oil emitted from the emission hole 100 of the nozzle 98c, which is provided in the distal end portion of the oil pipe 95, is supplied to the counter gear 28, the differential drive gear 30 and the bearings 49a, 49b that rotatably support the counter shaft 32 (on which the gears 28, 30 are disposed), as indicated by solid line in FIG. 3.

Further, as shown in FIG. 3, the oil pipe 95 is provided at its distal end portion with a discharge hole 108, such that a part of the oil discharged to the oil pipe 95 from the second oil pump P2 is supplied through the discharge hole 108 to the bearing 47a that rotatably supports the rotor shaft 46 of the first electric motor MG1. Further, as shown in FIG. 3, the casing 40 is provided with an oil guide 110 for guiding the oil discharged from the discharge hole 108, to the catch tank 90. It is noted that the oil guide 110 corresponds to "guide way" recited in the appended claims.

The catch tank 90 is located in a given position relative to the bearing 47a, a front end portion 110b, in the vehicle longitudinal direction, of the oil guide 110, and the discharge hole 108. The given position is located on an upper side, in the vehicle vertical direction, of the bearing 47a, on a lower side, in the vehicle vertical direction, of the front end portion 110b of the oil guide 110 and on a front side, in the vehicle longitudinal direction, of the discharge hole 108, in the apparatus installed state. The catch tank 90 is constituted by a rib 91 that is provided to protrude from the partition wall 56 of the casing 40 in a direction which is parallel to the second axis CL2 and which perpendicular to the partition wall 56. The rib 91 is formed integrally with the casing 40 by casting. The catch tank 90 has a recessed shape or U shape in its cross section, and opens upwardly in the vertical direction, such that the oil guided by the oil guide 110 is stored in the catch tank 90. The rib 91, which provides the catch tank 90, includes an axle-case-side portion and a housing-side portion that are provided in the respective axle case 40b and housing 40a that constitute the casing 40. The axle-case-side portion of the rib 91 protrudes from the partition wall 56 of the casing 40, while the housing-side portion of the rib 91 protrudes from another wall of the casing 40 (i.e., a wall of the housing 40a) which is opposed to the partition wall 56 in the direction of the second axis CL2. Thus, with the housing 40a and the axle case 40b being fixed to each other, the axle-case-side portion and the housing-side portion cooperate with each other to constitute the catch tank 90 having a shape that enables the oil to be stored in the catch tank 90. It is also possible to interpret also that the catch tank 90 is constituted by cooperation of the axle-case-side portion and the housing-side portion of the rib 91, the partition wall 56 and the above-described other wall of the casing 40 which is opposed to the partition wall 56. It is noted that the rib 91 corresponds to "first rib" recited in the appended claims.

The oil guide 110 is located on an upper side of each of the counter gear 28 and the output gear 26 in the vertical direction in the apparatus installed state. The oil guide 110 is constituted by a rib 111 that is provided to protrude from the partition wall 56 of the casing 40 in a direction which is parallel to the second axis CL2 and which perpendicular to the partition wall 56. The oil guide 110 has an elongated shape in its cross section, and is elongated in the vehicle longitudinal direction. The rib 111 is formed integrally with the casing 40 by casting.

The oil guide 110 has a rear end portion 110a that is opposite to the above-described front end portion 110b in the vehicle longitudinal direction, and the rear end portion 110a is located on a lower side of the discharge hole 108 in the vehicle vertical direction, such that the oil discharged from the discharge hole 108 is received in the oil guide 110. Meanwhile, the front end portion 110b of the oil guide 110 is located on an upper side of the catch tank 90 in the vertical direction. Further, the front end portion 110b of the oil guide 110 is located on a lower side of the rear end portion 110a of the oil guide 110, so that the oil guide 110 is inclined so as to be lower in the vertical direction as the oil guide 110 extends in a front direction of the vehicle 8. The rib 111, which provides the oil guide 110, includes an axle-case-side portion and a housing-side portion that are provided in the respective axle case 40*b* and housing 40*a* that constitute the casing 40. The axle-case-side portion of the rib 111 protrudes from the partition wall 56 of the casing 40, while the housing-side portion of the rib 111 protrudes the above-described wall of the casing 40 which is opposed to the partition wall 56 in the direction of the second axis CL2. Thus, with the housing 40*a* and the axle case 40*b* being fixed to each other, the axle-case-side portion and the housing-side portion of the rib 111 cooperate with each other to constitute the oil guide 110 having a shape that enables the oil to be introduced into the catch tank 90. It is noted that the rib 111 corresponds to "second rib" recited in the appended claims.

Therefore, the oil discharged from the discharge hole 108 is moved, owing to its own weight, from the rear end portion 110*a* of the oil guide 110 toward the front end portion 110*b* of the oil guide 110, along wall surfaces on the upper side of the oil guide 110 in the vertical direction. When reaching the front end portion 110*b* of the oil guide 110, the oil drops from the front end portion 110*b* and is caught in the catch tank 90. Thus, the oil discharged from the discharge hole 108 is guided by the oil guide 110 and is stored in the catch tank 90.

Between the front end portion 110*b* of the oil guide 110 and a rear end portion, in the vehicle longitudinal direction, of the catch tank 90 in the vehicle vertical direction, there is a first gap 112 through which the oil stirred by the output gear 26 is to be introduced into the catch tank 90. During forward running of the vehicle 8, the output gear 26 is rotated in a direction indicated by arrow (represented by broken line) in FIG. 3, so that a part of the oil scooped up by the differential ring gear 38 is stirred by the output gear 26 that is rotated together with the differential ring gear 38, whereby the part of the oil is scattered and moved toward the catch tank 90 as indicated by arrow (represented by solid line) in FIG. 3. Thus, the scattered oil is supplied through the first gap 112 into the catch tank 90. The oil stored in the catch tank 90 passes through the introduction hole 92 formed in the partition wall 56 of the casing 40 and the third supply passage 94 (see FIG. 2) so as to be supplied to the bearing 47*a*. It is noted that the first gap 112 corresponds to "gap" recited in the appended claims.

Between a front end portion, in the vehicle longitudinal direction, of the catch tank 90 and a wall of the casing 40, there is a second gap 114 through which the oil excessively stored in the catch tank 90 is discharged. The front end portion of the catch tank 90 is opposite, in the vehicle longitudinal direction, to the above-described rear end portion of the catch tank 90, which cooperates with the above-described front end portion 110*b* of the oil guide 110 to define the first gap 112 therebetween. A lower end of the second gap 114 is lower than a lower end of the first gap 112 in the vehicle vertical direction, so that, when the oil level in the catch tank 90 reaches the lower end of the second gap 114, the surplus oil is discharged through the second gap 114. Thus, the catch tank 90 is configured such that the surplus oil is discharged from a side of the front end portion of the catch tank 90 which is opposite, in the vehicle longitudinal direction (i.e., horizontal direction that is perpendicular to the second axis CL2) to the rear end portion of the catch tank 90, which cooperates with the front end portion 110*b* of the oil guide 110 to define the first gap 112 therebetween. Further, the second gap 114 is located on a front side of the output gear 26 in the vehicle longitudinal direction. That is, the second gap 114 is located in a position that does not overlap with the output gear 26 in the vehicle vertical direction, so that the oil discharged through the second gap 114 is moved down, for example, along wall surfaces of the casing 40, without being brought into contact with the output gear 26, so as to be returned to the oil storage portion 72.

In the lubrication device 64 constructed as described above, the second oil pump P2 is driven during forward running of the vehicle 8. When the second oil pump P2 is driven, a part of the oil discharged from the second oil pump P2 is caused to pass through the oil pipe 95 constituting the second supply passage 68 and is emitted from the emission hole 100 of each of the nozzles 98*a*-98*c*. The oil emitted from the emission hole 100 of each of the nozzles 98*a*-98*c* is supplied to various gears such as the gears 28, 30, 36 and various bearings such as the bearings 49*a*, 49*b*, 59*a*, 59*b*, 62*a*, 62*b*. Further, another part of the oil discharged from the second oil pump P2 is caused to pass through the oil pipe 95 and is discharged from the discharge hole 108. The oil discharged from the discharge hole 108 is guided by the oil guide 110 to be stored in the catch tank 90. The oil stored in the catch tank 90 is caused to pass through the introduction hole 92 so as to be supplied to the bearing 47*a* whereby the bearing 47*a* is lubricated.

During forward running of the vehicle 8, the oil stored in the first storage portion 76 is scooped up by the differential ring gear 38 so as to be supplied to the various gears and bearings provided in the gear room 58, and a part of the oil scooped up by the differential ring gear 38 is stirred by the output gear 26 so as to be scattered to pass through the first gap 112. The oil passing through the first gap 112 is stored in the catch tank 90. During the forward running, when the amount of the oil stored in the first storage portion 76 is reduced and the amount of the oil scooped by the differential ring gear 38 is reduced, there might be a risk that the amount of the oil supplied to the catch tank 90 through the first gap 112 could be reduced. However, in the present embodiment, with the second oil pump P2 being driven, the oil discharged from the second oil pump P2 is stably supplied to the catch tank 90 through the oil pipe 95 and the oil guide 110. Therefore, there is no risk that the amount of the oil passing through the introduction hole 92 provided in the catch tank 90 to lubricate the bearing 47*a*, so that the lubrication of the bearing 47*a* is assured. Thus, it is possible to prevent the bearing 47*a* from suffering from galling that could be caused by shortage of the oil supplied to the bearing 47*a*. Thus, since the lubrication of the bearing 47*a* can be assured without extending the oil pipe 95 to the position of the bearing 47*a*, it is possible to restrain reduction of the manufacturability and increase of the manufacturing cost, which could be caused if the oil pipe 95 were extended to the position of the bearing 47*a*.

Further, since the oil guide 110 is made inclined so as to become lower in the vertical direction as the oil guide 110 extends toward a front side of the vehicle 8, the oil is smoothly moved along the oil guide 110 without the retention on the oil guide 110, so that it is possible to reduce delay of supply of the oil to the bearing 47*a* even when the amount of the oil discharged from the discharge hole 108 is small.

Further, even when it becomes difficult to supply the oil to the catch tank 90 through the oil pipe 95 and the oil guide 110, for example, in the event of failure of the second oil pump P2, the oil stirred by the output gear 26 is caused to pass through the first gap 112 so as to be supplied to the catch tank 90, so that the oil is reliably supplied to the bearing 47*a*.

Further, when the oil has been excessively supplied to the catch tank 90, the surplus oil is discharged from the catch tank 90 through the second gap 114 and is returned to the oil storage portion 72 without the surplus oil being brought into contact with the output gear 26. Thus, since the surplus oil does not come into contact with the output gear 26, it is possible to restrain so-called "stirring loss" which could be caused if the surplus oil were stirred by the output gear 26.

As described above, in the present embodiment, when the oil sucked by the second oil pump P2 is discharged from the discharge hole 108 of the oil pipe 95, the discharged oil is caused to pass through the oil guide 110 so as to be introduced into the catch tank 90. This arrangement makes it possible to supply the oil to the bearing 47a, without extending the oil pipe 95 to the bearing 47a, thereby restraining reduction of the manufacturability of the oil pipe 95. Further, each of the catch tank 90 and the oil guide 110 is provided by a part of the casing 40 in the form of a corresponding one of the ribs 91, 111, so that the catch tank 90 and the oil guide 110 can be easily formed by casting. Thus, the bearing 47a can be lubricated without considerable increase of the manufacturing cost.

Further, in the present embodiment, even when it becomes impossible to supply the oil to the bearing 47a by the second oil pump P2, for example, in the event of failure of the second oil pump P2, the bearing 47a can be lubricated by the oil stirred by the output gear 26. Further, when a part of the oil stored in the catch tank 90 becomes surplus, the surplus part of the oil is discharged through the second gap 114 located on one of opposite sides of the catch tank 90 which is remote from the first gap 112, so that it is possible to restrain the stirring loss which could be cause if the surplus part of the oil were stirred by the output gear 26. Still further, it is possible to assure a sufficient amount of the oil that is supplied to the bearing 47a supporting the rotor shaft 46 of the first electric motor MG1, thereby preventing the bearing 47a from suffering from galling that could be caused by shortage of the oil supplied to the bearing 47a.

While the preferred embodiment of this invention has been described in detail by reference to the drawings, it is to be understood that the invention may be otherwise embodied.

In the above-described embodiment, the second oil pump P2 is to be driven by rotation of the differential ring gear 38 of the differential device 20. However, the second oil pump P2 may be modified, for example, such that the second oil pump P2 is to be driven by rotation of another rotary member such as the differential drive gear 30 as long as the other rotary member is to be rotated with rotation of the differential ring gear 38.

In the above-described embodiment, the first oil pump P1 is to be driven by rotation of the engine 12. However, the first oil pump P1 does not necessarily have to be driven by the engine 12 but may be an electrically-operated oil pump that is to be driven by an electric motor.

In the above-described embodiment, the drive-force transmitting apparatus 10 is to be installed in the vehicle 8 of FF system. However, the present invention is applicable also to a vehicle of FR (front engine/rear drive) system. In this case, in general, the first through fourth axes CL1-CL4 are arranged to extend in parallel in the vehicle longitudinal direction, and the oil guide 110 is disposed to be elongated in the width direction of the vehicle 8. Further, the first and second gaps 112, 114, which are provided on the respective opposite sides of the catch tank 90, are located in respective positions that are distant from each other in the width direction of the vehicle 8, and the second gap 114 is located on one of opposite sides, in the width direction, of the catch tank 90, which is remote from the first gap 112.

In the above-described embodiment, the upper end of the first partition wall 74 is positioned on a lower side of the second partition wall 78. However, the upper ends of the respective first and second partition walls 74, 78 may be positioned in the same position as each other in the vertical direction. Further, the first and second partition walls 74, 78 do not necessarily have to be provided but may be omitted.

In the above-described embodiment, the oil stirred by the output gear 26 is caused to pass through the first gap 112 to be stored in the catch tank 90. However, this arrangement may be modified such that the oil is stirred by any other rotary member rotated during forward running of the vehicle 8, so as to be caused to pass through the first gap 112 to be stored in the catch tank 90.

In the above-described embodiment, the ribs 91, 111 constituting the catch tank 90 and the oil guide 110 are formed integrally with the casing 40 by casting. However, the ribs 91, 111 may be formed independently of the casing 40, and may be fixed to the casing 40, for example, by welding or using fasteners such as screws.

In the above-described embodiment, the rear end portion 110a of the oil guide 110 extends to a position that is located right below the discharge hole 108 in the vertical direction. However, the rear end portion 110a of the oil guide 110 does not necessarily have to extend to the position that is located right below the discharge hole 108 as long as the oil discharged from the discharge hole 108 can be received in the oil guide 110.

In the above-described embodiment, the drive-force transmitting apparatus 10 includes rotary members each of which is to be rotated about a corresponding one of the first through fourth axes CL1-CL4. However, the rotary elements included in the drive-force transmitting apparatus do not necessarily have to be rotated about the four axes CL1-CL4, but may be rotated about three axes.

It is to be understood that the embodiment described above is given for illustrative purpose only, and that the present invention may be embodied with various modifications and improvements which may occur to those skilled in the art.

NOMENCLATURE OF ELEMENTS

8: vehicle
10: vehicle drive-force transmitting apparatus
26: output gear (second-axis gear)
38: differential ring gear
40: casing
46: rotor shaft (rotary member)
47a: bearing
90: catch tank
91: rib (first rib)
95: oil pipe (pipe)
95a: proximal end portion
108: discharge hole
110: oil guide (guide way)
111: rib (second rib)
112: first gap (gap)
P2: second oil pump (mechanical pump)
MG1: first electric motor (electric motor)
CL1: first axis
CL2: second axis

What is claimed is:
1. A drive-force transmitting apparatus that is to be installed in a vehicle, said drive-force transmitting apparatus comprising:

a differential ring gear that is to be rotated about a first axis;

a rotary member that is to be rotated about a second axis, the second axis being parallel with the first axis and being distant from the first axis in a given direction, the given direction being a direction including a component of a horizontal direction of the vehicle in an apparatus installed state in which said drive-force transmitting apparatus is installed in the vehicle;

a mechanical pump that is to be driven when said differential ring gear is rotated;

a casing that stores therein said differential ring gear, said rotary member and said pump;

a bearing through which said rotary member is held by said casing;

a pipe that is connected at a proximal end portion thereof to said pump so as to supply oil sucked by said pump, to lubrication-required elements of said drive-force transmitting apparatus; said pipe extending in an extending direction and having a discharge hole provided in a distal end portion thereof, the extending direction being generally an upward direction of the vehicle in the apparatus installed state;

a catch tank that is provided by a first rib provided in said casing, said catch tank being configured to store therein the oil that is to be supplied to said bearing; and a guide way that is provided by a second rib provided in said casing, said guide way being configured to guide the oil discharged from said discharge hole, to said catch tank.

2. The drive-force transmitting apparatus according to claim 1, further comprising a second-axis gear which is stored in said casing and which is to rotated, together with said differential ring gear, about the second axis, wherein said guide way and said catch tank are spaced apart from each other, and cooperate with each other to define, between said guide way and said catch tank, a gap through which the oil stirred by said second-axis gear is to be introduced into said catch tank.

3. The drive-force transmitting apparatus according to claim 2, wherein said catch tank is configured such that a surplus part of the oil is discharged from one of opposite sides of said catch tank in the horizontal direction that is perpendicular to the second axis, said one of the opposite sides of said catch tank being remote from said gap.

4. The drive-force transmitting apparatus according to claim 1, wherein said rotary member is a rotor shaft of an electric motor.

5. The drive-force transmitting apparatus according to claim 1, wherein said casing includes a partition wall by which an interior of said casing is sectioned into a first room and a second room, wherein said differential ring gear, said pump, said pipe, said catch tank and said guide way are disposed in said first room, while said rotary member and said bearing are disposed in said second room, wherein said first and second ribs are provided on said partition wall, and wherein said catch tank is in communication with a through-hole that is formed through said partition wall, such that the oil is to be supplied, from said catch tank that is disposed in said first room, through said through-hole, to said bearing that is disposed in said second room.

* * * * *